United States Patent
Lin

(10) Patent No.: US 9,933,584 B2
(45) Date of Patent: Apr. 3, 2018

(54) DUPLEX FIBER OPTIC CONNECTOR PLUG WITH ANGLES ACTUATED LATCHING

(71) Applicant: JYH ENG TECHNOLOGY CO., LTD., New Taipei (TW)

(72) Inventor: Yen-Lin Lin, New Taipei (TW)

(73) Assignee: JYH ENG TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/619,533

(22) Filed: Jun. 11, 2017

(65) Prior Publication Data

US 2017/0276886 A1 Sep. 28, 2017

Related U.S. Application Data

(63) Continuation-in-part of application No. 15/015,105, filed on Feb. 3, 2016.

(51) Int. Cl.
*G02B 6/38* (2006.01)
*G02B 6/36* (2006.01)

(52) U.S. Cl.
CPC ......... *G02B 6/3893* (2013.01); *G02B 6/3636* (2013.01); *G02B 6/3825* (2013.01); *G02B 6/3879* (2013.01)

(58) Field of Classification Search
CPC .. G02B 6/3893; G02B 6/3636; G02B 6/3825; G02B 6/3879; G02B 6/36; G02B 6/38
See application file for complete search history.

(56) References Cited

U.S. PATENT DOCUMENTS

| | | | | |
|---|---|---|---|---|
| 5,675,682 A * | 10/1997 | De Marchi | .......... | G02B 6/3879 385/139 |
| 5,845,036 A * | 12/1998 | De Marchi | .......... | G02B 6/3825 385/139 |
| 6,024,498 A * | 2/2000 | Carlisle | ................ | G02B 6/3869 385/55 |
| 6,196,733 B1 * | 3/2001 | Wild | .................... | G02B 6/3887 385/139 |
| 6,254,418 B1 * | 7/2001 | Tharp | ................ | H01R 13/6335 439/352 |
| 6,672,898 B2 * | 1/2004 | Kahle | .................. | G02B 6/3879 385/55 |
| 6,758,601 B2 * | 7/2004 | Holmquist | ........... | G02B 6/3807 385/53 |
| 6,799,898 B2 * | 10/2004 | Cheng | .................. | G02B 6/3879 385/55 |
| D523,396 S * | 6/2006 | Shiraishi | ....................... | D13/133 |
| 7,510,334 B2 * | 3/2009 | Holmquist | ........... | G02B 6/3807 385/75 |
| 7,578,692 B2 * | 8/2009 | Kaneda | ................ | H01R 13/633 439/159 |

(Continued)

*Primary Examiner* — Andrew Jordan
(74) *Attorney, Agent, or Firm* — Leong C. Lei

(57) ABSTRACT

A duplex fiber optic connector plug includes at least one fiber optic connector, a first casing, a second casing and a release lever. The release lever is axially coupled to a surface of the first casing and has an end coupled to a release bracket of the fiber optic connector to form a seesaw design. During operation, the release lever is compressed by the force of the finger, so that an end of the release lever is elevated, and the other end compresses the release bracket downward to release from a fiber optic socket, so as to provide an intuitively convenient operation and improve the convenience of use.

12 Claims, 5 Drawing Sheets

(56) References Cited

U.S. PATENT DOCUMENTS

| | | | | |
|---|---|---|---|---|
| 7,588,373 B1* | 9/2009 | Sato | .................... | G02B 6/3893 |
| | | | | 385/53 |
| 8,152,384 B2* | 4/2012 | de Jong | ................ | G02B 6/3893 |
| | | | | 385/53 |
| 8,221,007 B2* | 7/2012 | Peterhans | ............ | G02B 6/3893 |
| | | | | 385/53 |
| 8,465,317 B2* | 6/2013 | Gniadek | ............ | H01R 13/6335 |
| | | | | 439/344 |
| 8,506,174 B2* | 8/2013 | Nakagawa | ........... | G02B 6/3897 |
| | | | | 385/55 |
| 8,814,445 B2* | 8/2014 | Gallegos | .............. | G02B 6/3879 |
| | | | | 385/59 |
| 8,840,419 B2* | 9/2014 | Huang | ................ | H01R 13/6272 |
| | | | | 439/352 |
| 9,203,202 B2* | 12/2015 | Wojcik | ................ | H01R 13/506 |
| 9,507,103 B2* | 11/2016 | Wu | ...................... | G02B 6/3893 |
| 2004/0047565 A1* | 3/2004 | Cheng | ................. | G02B 6/3879 |
| | | | | 385/71 |
| 2009/0042424 A1* | 2/2009 | Kaneda | ................ | H01R 13/633 |
| | | | | 439/159 |
| 2012/0002925 A1* | 1/2012 | Nakagawa | ........... | G02B 6/3897 |
| | | | | 385/78 |
| 2013/0051733 A1* | 2/2013 | Gallegos | .............. | G02B 6/3879 |
| | | | | 385/76 |
| 2015/0212282 A1* | 7/2015 | Lin | ...................... | G02B 6/3893 |
| | | | | 385/76 |
| 2017/0276886 A1* | 9/2017 | Lin | ...................... | G02B 6/3893 |

* cited by examiner

DUPLEX FIBER OPTIC CONNECTOR PLUG WITH ANGLES ACTUATED LATCHING

CROSS-REFERENCE TO RELATED APPLICATIONS

This application is a continuation-in-part patent application of U.S. application Ser. No. 15/015,105 filed on Feb. 3, 2016, the entire contents of which are hereby incorporated by reference for which priority is claimed under 35 U.S.C. § 120.

BACKGROUND OF THE INVENTION

1. Field of the Invention

The present invention relates to the technical field of fiber optic connectors, and more particularly to a duplex fiber optic connector plug operated by an upward pushing method.

2. Description of the Related Art

Maintenance of fiber optic wire in a fiber optic network is a relatively troublesome task. Conventional design fiber optic connector plug have fixed fiber optic connector which cannot be removed freely from the fiber optic connector plug. Therefore, when the fiber optic network malfunctions, it is often time hard to perform test to diagnose the source of the problem. Oftentimes, the fiber optic wire and connector are simply replaced whenever the network malfunctions. Obviously, the conventional fiber optic connectors waste unnecessary labor to change the connectors, cause inconvenience in their use, and require further improvements.

SUMMARY OF THE INVENTION

In view of the problems of the prior art, it is a primary objective of the present invention to provide a duplex fiber optic connector plug that can be easily disassembled and allows removal of the fiber optic connector.

To achieve the aforementioned and other objectives, the present invention provides a duplex fiber optic connector plug that is coupled to a fiber optic socket for a signal connection, and the duplex fiber optic connector plug comprises: a pair of fiber optic connectors, a second casing, and a first casing. In some instances, duplex fiber optic connector plug 1 may further comprise a release lever.

In a preferred embodiment, the first casing is divided into a first casing front section and a first casing rear section. Both sides of the first casing front section have a latching bump, and both sides of the first casing rear section are provided with a first latch hook respectively.

In a preferred embodiment, the second casing is also divided into a front section and a rear section. Both sides of the rear section are provided with a latch slot corresponding to the first latch hooks. The first latch hooks are latched and fixed into the latch slots so that the first casing rear section and the rear section form a single body. Both sides of the front section are provided with two second latch hooks. And the second latch hooks are latched to the two sides of the first casing front section to create fixture.

In another preferred embodiment, the release lever may be integrated with the axial connection position of the first casing or the first casing has a first axial connection portion, and the release lever has a second axial connection portion, and a shaft is passed through the first axial connection portion and the second axial connection portion to define a movable axial connection status. Both of the aforementioned axial connection methods have the effects of improving the service life, lowering the manufacturing cost, providing different effects to meet the convenient application requirement, and enhancing the design flexibility significantly. In addition an elevated portion is formed at the bottom of the release lever and disposed between the axial connection position and the second contact surface for elevating the release lever to move the first contact surface downward. The first contact surface is a cambered surface which is concave downwards, so that the distal portion of the release bracket may be moved on the first contact surface to provide a smooth movement.

In another preferred embodiment, when a force is applied to the front section of the second casing, an angular motion of the front section relative to the pliable portion and the rear section is actuated. The front section is bent down and open.

The present invention enables fast and easy cable line maintenance and is convenient for maintenance personnel to operate. This is previously unachievable with conventional design of the fiber optic connector plug.

DETAILED DESCRIPTION OF THE PREFERRED EMBODIMENTS

The technical content of the present invention will become apparent with the detailed description of preferred embodiments and the illustration of related drawings as follows.

Figure 1:
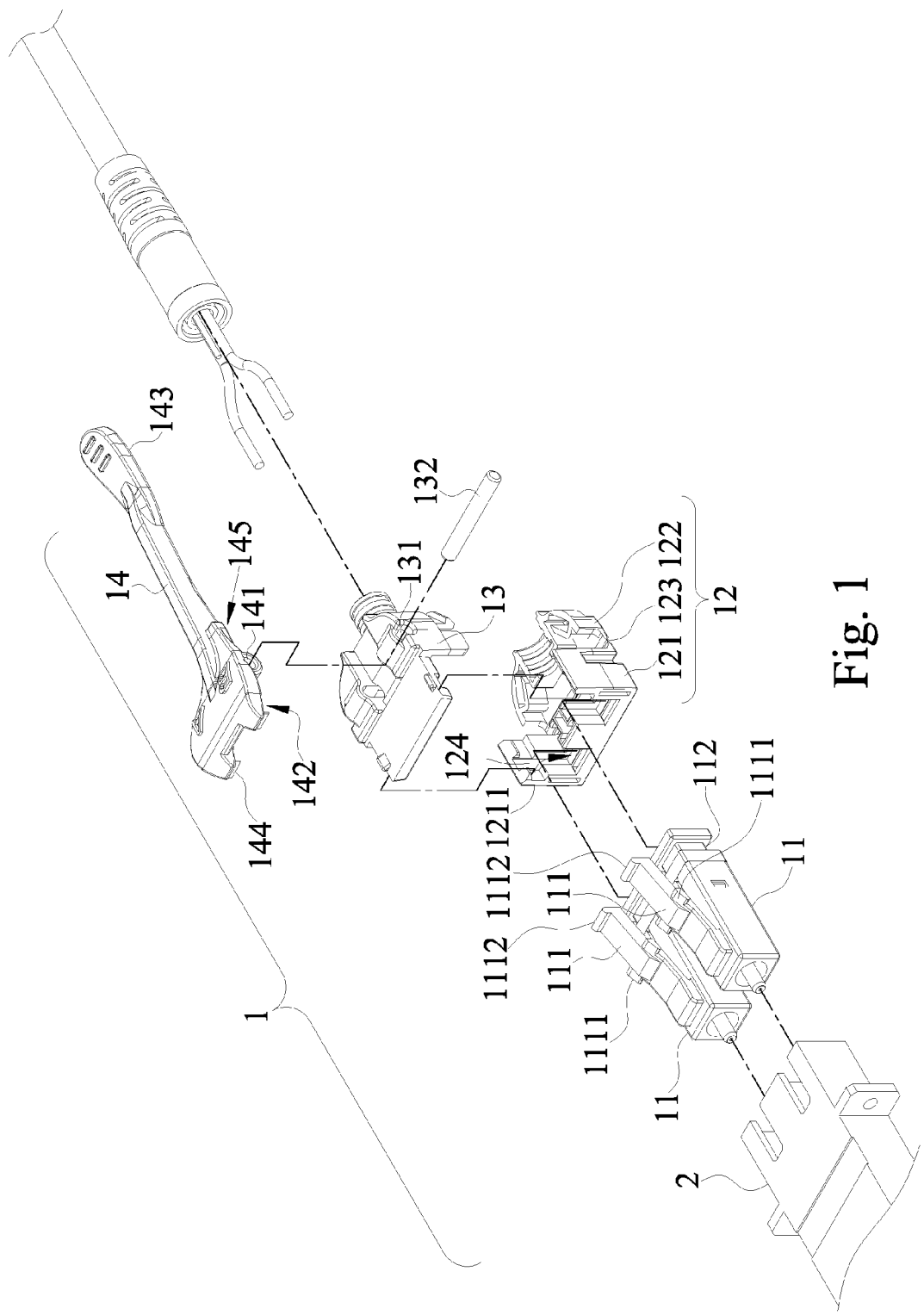
FIG. 1 is an exploded view of a preferred embodiment of the present invention.
Figure 2:
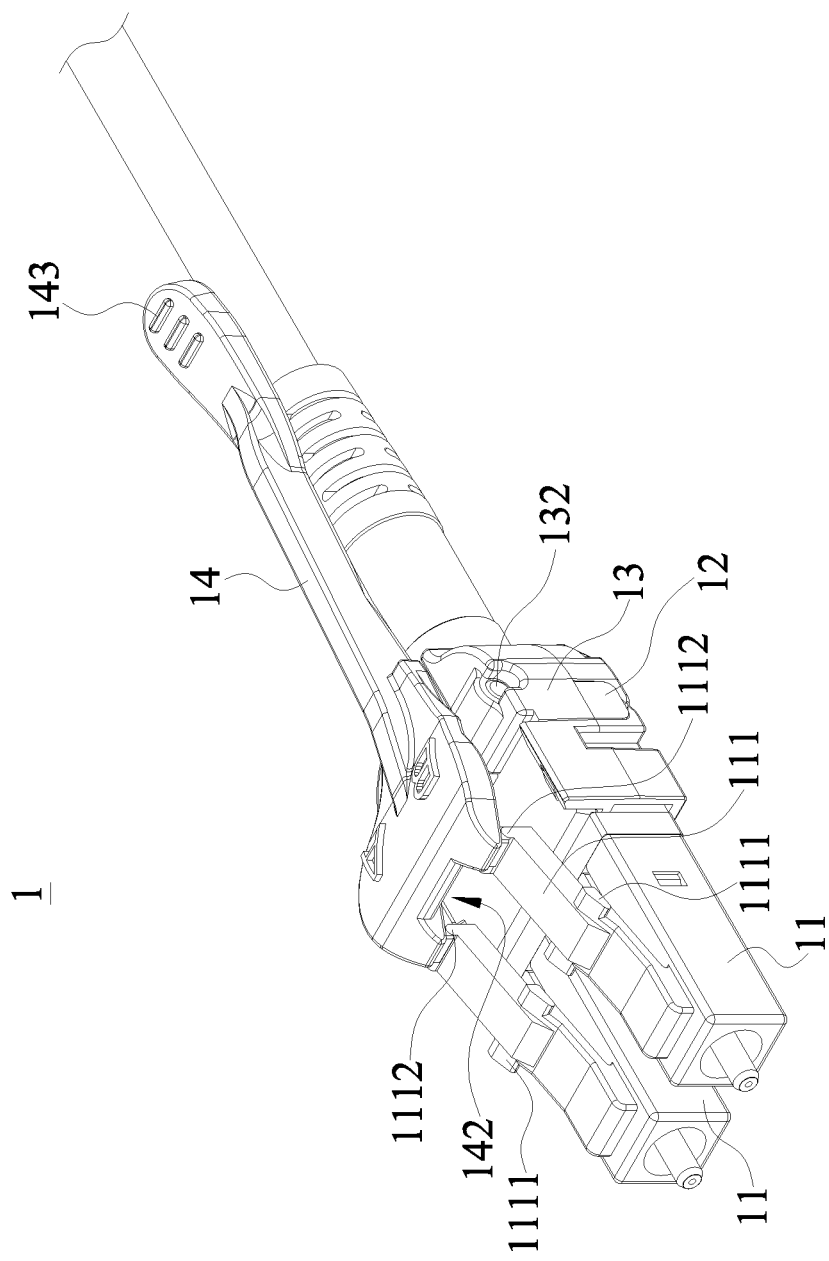
FIG. 2 is a perspective view of a preferred embodiment of the present invention.

With reference to FIGS. 1 to 2 for an exploded view and a perspective view of a duplex fiber optic connector plug 1 in accordance with a preferred embodiment of the present invention respectively, the duplex fiber optic connector plug 1 is provided for connecting a fiber optic socket 2 to complete a signal connection, and the duplex fiber optic connector plug 1 comprises a pair of fiber optic connectors 11, a second casing 12, and a first casing 13. In some instances, duplex fiber optic connector plug 1 may further comprises a release lever 14.

Each fiber optic connector 11 has a release bracket 111 installed on a surface of the fiber optic connector 11. A locking piece 1111 is disposed on both sides of the middle section of the release bracket 111 separately for coupling to the fiber optic socket 2. In addition, a latch portion 112 is disposed at a rear section of the fiber optic connector 11 and has a middle section in a necking H-shaped structure.

The second casing 12 is divided into a front section 121 and a rear section 122; and a pliable portion 123 is provided for connecting the front section 121 and the rear section 122, so that the front section 121 can be folded with respect to the rear section 122. A slot 1211 is formed in the front section 121, and the latch portion 112 of the fiber optic connector 11 is latched into the slot 1211 and a first groove 124 to define a fixation.

The first casing 13 is covered onto the second casing 12 to fix the two fiber optic connectors 11 between the second casing 12 and the first casing 13 as shown in FIG. 2, and a first axial connection portion 131 is disposed at the top the first casing 13.

In some embodiment, a second axial connection portion 141 is disposed in the middle section of the release lever 14, and a shaft 132 is passed through the first axial connection portion 131 and the second axial connection portion 141 to define a movable axial connection.

In some embodiments, a first contact surface 142 is disposed at a front section of the release lever 14 and coupled to a distal portion of the release bracket 111, and the rear section of the release lever 14 is tilted upwardly to form a second contact surface 143. Experiments show that the best and most labor saving effect can be achieved without interfering other adjacent duplex fiber optic connector plugs 1, if the ratio of the distance between the distal portion of the first contact surface 142 of the release lever 14 and the second axial connection portion 141 to the distance between the second axial connection portion 141 and a distal portion of the second contact surface 143 falls within a range from 1:2 to 1:5. In addition, an inverted hook portion 144 is extended downwardly from the distal portion of the first contact surface 142, and an abutting portion 1112 is extended upwardly from the distal portion of the release bracket 111, so that the inverted hook portion 144 and the abutting portion 1112 can be latched and contacted with each other without having any gap, so that the plug will not fall off easily during use.

In some embodiments, an elevated portion 145 is formed at the bottom side of the release lever 14, and disposed between the axial connection position and the second contact surface 143 for elevating the release lever 14 in order to move the first contact surface 142 downward. Further, the first contact surface 142 is a cambered surface which is concave downwards, so that a distal portion of the release bracket 111 can be moved on the first contact surface 142, and an upwardly tilted angle of the second contact surface 143 falls within a range from 10 degrees to 35 degrees to facilitate the operation by the technician's fingers and guide the movement along the second contact surface 143. Further, the release lever 14 may be made by plastic injection molding and formed at the axial connection position of the second casing 12.

One of the key aspects of the present application is that since the duplex fiber optic connector plug 1 of the present invention has two separate and moveable fiber optic connectors 11 and openable casing, a fiber optic jumping operation can be achieved; or the two fiber optic connectors 11 can be switched for easy maintenance, which cannot be achieved by the current design of fiber optic connector plug 1.

Figure 3:
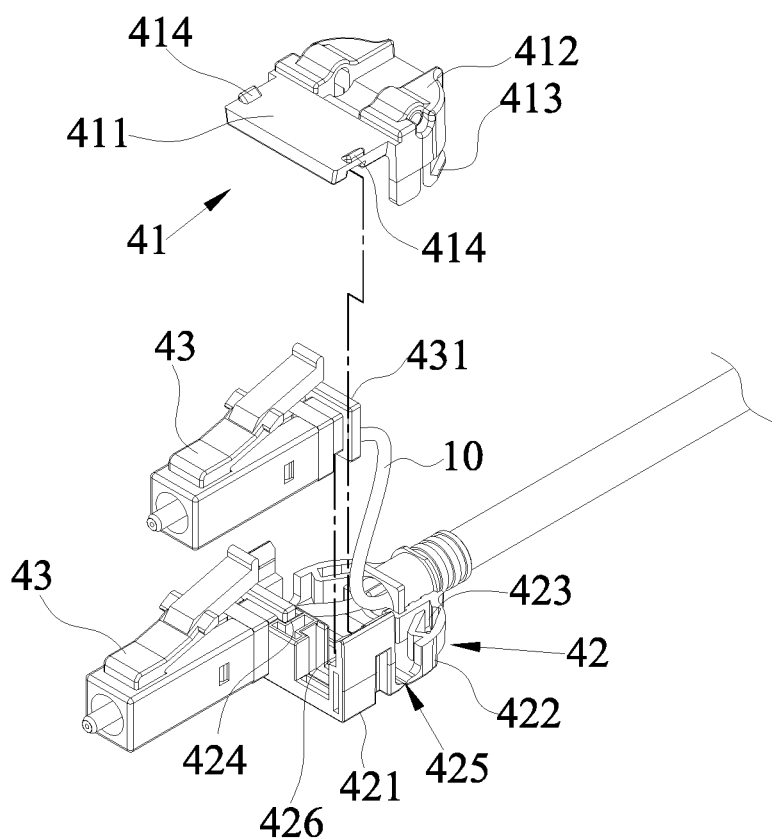
FIG. 3 is an another exploded view of a preferred embodiment of the present invention.
Figure 4:
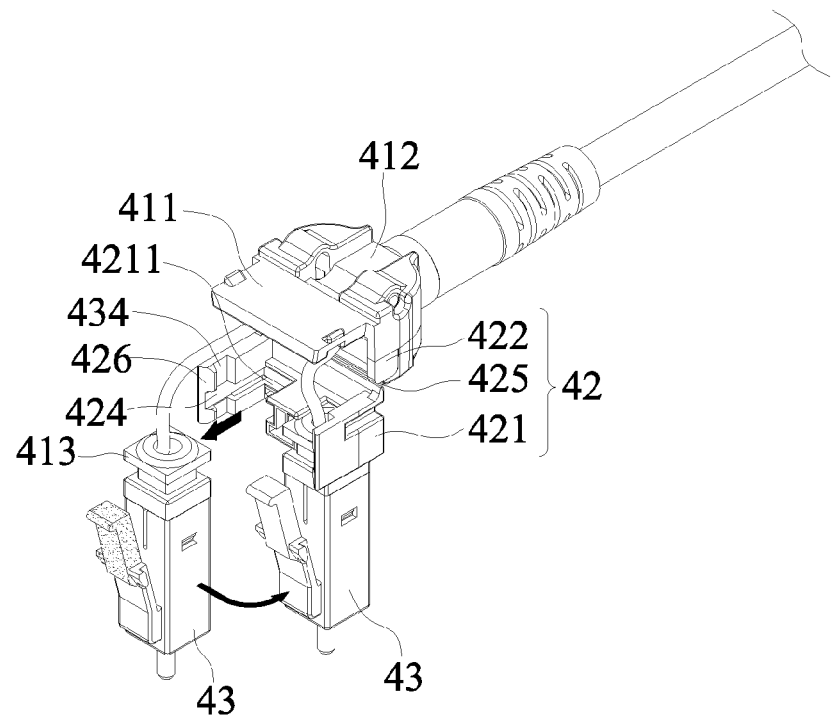
FIG. 4 is a schematic view of a preferred embodiment of the present invention with the front section being bent downward.
Figure 5:
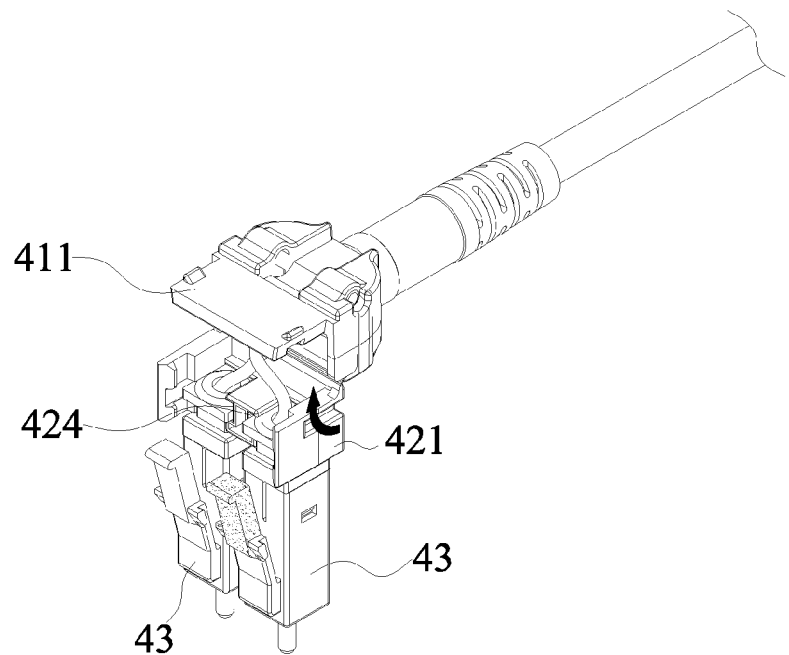
FIG. 5 is an another schematic view of a preferred embodiment of the present invention with the front section being bent downward.

Please refer to FIG. 3-5, the first casing 41 is divided into a first casing front section 411 and a first casing rear section 412. Both sides of the first casing front section 411 have a latching bump 414, and both sides of the first casing rear section 412 are provided with a first latch hook 413 respectively. The first casing front section 411 is a sheet-like structure.

The second casing 42 is also divided into a front section 421 and a rear section 422. Both sides of the rear section 422 are provided with a latch slot 423 corresponding to the first latch hooks 413. The first latch hooks 413 are latched and fixed into the latch slots 423 so that the first casing rear section 412 and the rear section 422 form a single body. Both sides of the front section 421 are provided with two second latch hooks 426. And the second latch hooks 426 are latched to the two sides of the first casing front section 411 to create fixture. The inside of the second casing 42 has two first grooves 424 and two second grooves 434, the two first grooves 424 and two second grooves 434 are provided approximate to the second latch hooks 426. When assembled, the latching bumps 414 couple with the first grooves 424; in the meantime, the two sides of first casing front section 411 engage with the second grooves 434. Please refer particularly to FIG. 3, the figures shows that the first grooves 424 act as a coupling mechanism for the latching bump 414, and a fixing mechanism for the latch portion 431 of the fiber optic connector 43.

The pliable portion 425 is formed by injection molding onto the surface of the second casing 42 such that the longitudinal direction of the pliable portion 425 is perpendicular to longitudinal direction of the fiber optic connector 43. The thickness of the pliable portion 425 is 0.5-0.8 times of the second casing 42.

When each of the fiber optic connectors 43 is latched to the first groove 424 and the slot 4211 respectively, the positioning of the first casing 41 and the second casing 42 is achieved by latching the latching bump 414 on both sides of a first casing front section 411 of the first casing 41 to the first groove 424 of the second casing 42. And each of the of the fiber optic connectors 43 has a fiber optic line contained therein.

Please refer to FIG. 3-5 again for illustration of the operation of the present invention. The second latch hooks 426 can be unclipped to separate the front section 421 and the first casing front section 411. Since the front section 421 and the rear section 422 are connected with a pliable portion 425, when a force is applied to the front section 421 of the second casing 42, an angular motion of the front section 421 relative to the pliable portion 425 and the rear section 422 is actuated. The front section 421 is bent down and open. At this moment, the second latch hooks 426 are thus decoupled with the two sides of the first casing front section 411, and the latching bumps 414 are disengaged with the first groove 424. The first casing rear section 412 and the rear section 422 are still coupled to each other. After the front section 421 is bent downward, the fiber optic connectors 43 are exposed for easy access and removal. The optical fiber connectors 43 can be removed, switched position and placed back to the positioning slot 424 freely. When desired, the front section 421 can be latched back to the first casing front section 411.

Figure 6:
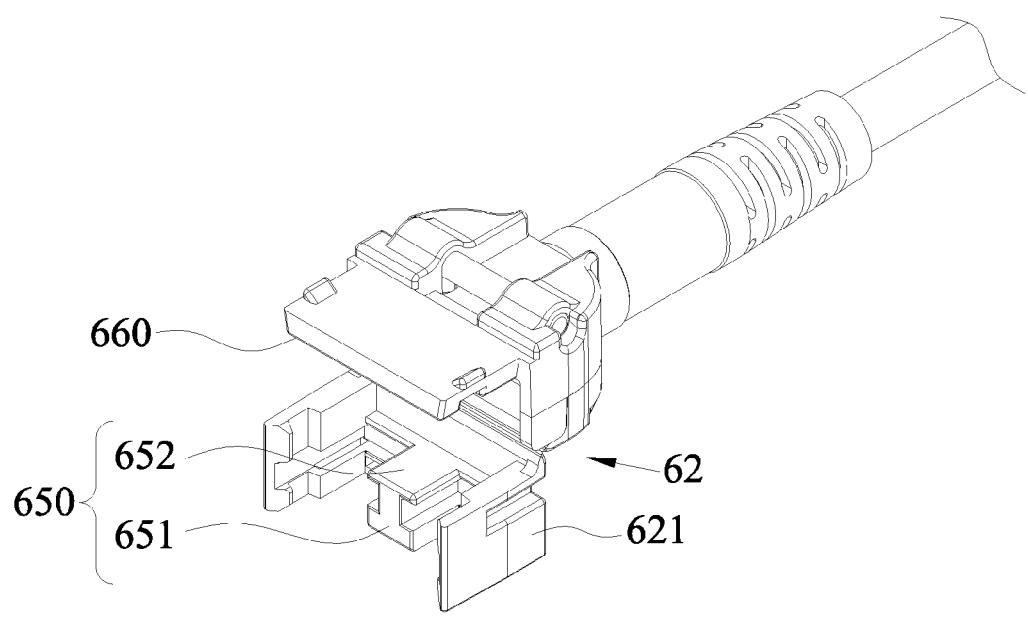
FIG. 6 is an another schematic view of a preferred embodiment of the present invention with the front section being bent downward.

Please refer to FIG. 6 for the next prefer embodiment of the present invention. The second casing 62 may comprises a partition element 650 for maintain the position of the fiber optic connectors (not shown). The partition element 650 is provided on the front section 621. The surfaces of the partition element 650 are provided with permanent magnet layer by coating; or in some instances, the partition element 650 may be entirely constructed with pieces of permanent magnets. Other means for constructing the partition element 650 may be apparent to a person having ordinary skill in the art. The partition element 650 may comprises a first surface 651 and a second surface 652. The first surface 651 and the second surface 652 are two orthogonal and adjacent surfaces of the partition element 650. Furthermore, the first surface 651 and a second surface 652 have opposite magnetic polarity. In this embodiment, the bottom side of the first casing front section 660 also comprises a permanent magnet layer which has the opposite magnetic polarity relative to the first surface 651 of the partition element 650; that is to say, the magnetic polarity of the bottom side of the first casing front section 660 is the same as the magnetic polarity of the second surface 652 of the partition element 650. When the duplex fiber optic connector plug 1 is in a close state (please refer to FIG. 2), the bottom side of the first casing front section 660 is in contact with the first surface 651 of the partition element 650, and the magnetic attractive force between the bottom side of the first casing front section 660 and the first surface 651 secures the closing position of the duplex fiber optic connector plug. On the other hand, when the duplex fiber optic connector plug 1 is in an open state (please refer to FIG. 6), the bottom side of the first casing front section 660 is facing the second surface 652 of the partition element 650. Thus the magnetic repulsive force between the bottom side of the first casing front section 660 and the second surface 652 helps maintain the open position of the duplex fiber optic connector plug 1. As a result of the abovementioned design, the present application is much easier for the maintenance personnel to operate.

The present invention enables fast and easy cable line maintenance and is convenient for maintenance personnel to operate. This is previously unachievable with conventional design of the fiber optic connector plug.

What is claimed is:

1. A duplex fiber optic connector plug, for coupling a fiber optic socket to complete a signal connection, comprising:
   at least one fiber optic connector, having a release bracket installed on a surface of the fiber optic connector;
   a first casing, coupled to a rear section of the fiber optic connector, a rear section of the first casing being provided with at least one first latch hook and a front section of the first casing being provided with at least one latching bump;
   a second casing, covered onto the first casing, a front section of the second casing being provided with at least one second latch hook to couple to two sides of the front section of the first casing, wherein an interior of the second casing comprises a two first grooves and two second grooves, the two second grooves being provided approximate to the second latch hooks;
   wherein the latching bump engages with the first grooves and the two sides of the front section of the first casing engage with the second grooves;
   wherein, the front section and the rear section of the second casing are connected with a pliable portion such that an angular motion of the front section of the second casing relative to the pliable portion and the rear section of the second casing is actuated when a force is applied to the front section of the second casing so that the second latch hook is decoupled with the two sides of the front section of the first casing, and the latching bump is disengaged with the first groove,
   wherein, a surface of each of the fiber optic connectors comprises a latch portion for snapping the fiber optic connectors to the first groove,
   wherein the first grooves intersect with the second grooves.

2. The duplex fiber optic connector plug of claim 1, further comprising a release lever, with a middle section axially coupled to the top side of the second casing, and having a first contact surface disposed at a front section of the release lever and contacted with the release bracket, and the rear section of the release lever being tilted upwardly to form a second contact surface, so that when duplex fiber optic connector plug is plugged into the fiber optic socket, the locking piece of the release bracket is latched and fixed into the fiber optic socket, and after the second contact surface is pushed by a force to move upward, the release lever uses the pivotal connection position as a fulcrum to drive the first contact surface to move downward, so that the locking piece of the release bracket is separated from the fiber optic socket to define a release status.

3. The duplex fiber optic connector plug of claim 1, wherein the ratio of the distance between a distal portion of the first contact surface of the release lever and the axial connection position to the distance between the axial connection position and a distal portion of the second contact surface falls within a range from 1:2 to 1:5.

4. The duplex fiber optic connector plug of claim 1, wherein the distal portion of the first contact surface has an inverted hook portion extended downwardly, and the distal portion of the release bracket has an abutting portion extended upwardly, so that the inverted hook portion and the abutting portion may be latched with each other.

5. The duplex fiber optic connector plug of claim 4, wherein the release lever has an elevated portion formed at the bottom of the release lever and disposed between the axial connection position and the second contact surface for elevating the release lever to move the first contact surface downward.

6. The duplex fiber optic connector plug of claim 1, wherein the release lever is integrally formed with the axial connection position of the first casing.

7. The duplex fiber optic connector plug of claim 6, wherein the release lever has an elevated portion formed at the bottom of the release lever and disposed between the axial connection position and the second contact surface for elevating the release lever to move the first contact surface downward.

8. The duplex fiber optic connector plug of claim 1, wherein the first casing has a first axial connection portion, and the release lever has a second axial connection portion, and a shaft is passed through the first axial connection portion and the second axial connection portion to define a movable axial connection status.

9. The duplex fiber optic connector plug of claim 1, wherein the first contact surface is cambered surface which is concave downwards, so that the distal portion of the release bracket may be moved on the first contact surface.

10. The duplex fiber optic connector plug of claim 1, wherein the second contact surface has an upwardly tilted angle falling within a range from 10 degrees to 35 degrees.

11. The duplex fiber optic connector plug of claim 1, wherein a thickness of the pliable portion is 0.5-0.8 times of a thickness of the second casing, a ratio between a distance from the pliable portion to the front section of the second casing and a distance from the pliable portion to the rear section of the second casing is 1:2-1:5.

12. The duplex fiber optic connector plug of claim 1, wherein the second casing comprises a partition element on the front section, the partition element comprises a first surface and a second surface, the first surface and the second surface are provided with permanent magnets, and the first surface and the second surface have opposite magnetic polarity, a bottom side of the front section of the first casing comprises a permanent magnet layer which has a same magnetic polarity as the second surface.

\* \* \* \* \*